United States Patent [19]

Fogarasi et al.

[11] Patent Number: 4,931,004
[45] Date of Patent: Jun. 5, 1990

[54] FORM CARRIER AND ACTUATING DEVICE FOR THE VULCANIZATION OF TIRES FOR MOTOR VEHICLES

[75] Inventors: Gábor Fogarasi; Imre Siv/; Gábor Zacsek; István Zakariás, all of Budapest, Hungary

[73] Assignee: Taurus Gumiipari Vallalat, Hungary

[21] Appl. No.: 255,769

[22] Filed: Oct. 11, 1988

[30] Foreign Application Priority Data

Dec. 16, 1987 [HU] Hungary ............... 5722/87

[51] Int. Cl.$^5$ .............................................. B29C 35/02
[52] U.S. Cl. ...................................... 425/28.1; 425/35; 425/47
[58] Field of Search ................... 425/28.1, 35, 47; 264/326

[56] References Cited

U.S. PATENT DOCUMENTS

| | | | |
|---|---|---|---|
| 3,461,502 | 8/1969 | Turk et al. | 425/DIG. 5 |
| 3,464,090 | 9/1969 | Cantarutti | 425/DIG. 5 |
| 3,778,203 | 12/1973 | MacMillan | 425/DIG. 5 |
| 3,787,155 | 1/1974 | Zangl | 425/DIG. 5 |
| 3,797,979 | 3/1974 | Greenwood | 425/DIG. 5 |
| 3,806,288 | 4/1974 | Materick | 425/47 |
| 4,580,959 | 4/1986 | Pizzorno et al. | 425/28.1 X |
| 4,726,749 | 2/1988 | Katsumata | 425/47 |

FOREIGN PATENT DOCUMENTS 170109 2/1986 European Pat. Off. .
2254334 12/1977 Fed. Rep. of Germany .

Primary Examiner—Richard L. Chiesa
Attorney, Agent, or Firm—Handal & Morofsky

[57] ABSTRACT

The invention relates to form carrier and actuating construction for the vulcanizing machine of rubber tires for motor vehicles, wherein the vertically moveable upper part contains a catch-ring connected to the dome of the vulcanizing machine, an upper plate fitting thereto, a locking ring, furtheron form-segments defining the daylight and upper form-half, while the fixed bottom part includes the base plate and the lower form-half fixed thereto. The construction according to the invention can be characterized in that the form-segments (16) are fixed exchangeably to the gliding segments (4) which can be guided ascew in the guide rails having been formed on the inner conical or pyramidal surface of the locking ring (3) and the gliding segments (4) are connected to the upper plate (1) with the insertion of horizontal guide elements and on the locking ring (3) there is a correction (11) provided with set-screws (10) and fixing screws gap between the catch ring (5) and the upper plate (1).

10 Claims, 7 Drawing Sheets

FORM CARRIER AND ACTUATING DEVICE FOR THE VULCANIZATION OF TIRES FOR MOTOR VEHICLES

BACKGROUND

The invention relates to a form carrier and actuating device for the machine vulcanizing tires for motor vehicles, which—in comparison to machines having been used up to now for the same purpose—enables the application in a far wider circle by the fact, in so far as it can be rendered suitable for the vulcanizing-pressing tools for tires being different in respect to dimensions. The form constructions having been developed in other plants with exchangeable tread forms, the so-called containers are ordered to one single type of vulcanizing machine, restricting these systems to a narrow range of tire-dimensions.

Inaccuracies occuring in course of production, such as deformations arising while vulcanizing can be eliminated only by disassembling the container, the pre-stress gap required by vulcanizing technology—the role of which will be detailed later—can be adjusted to the desired value exclusively by the subsequent processing of the components of the disassembled container. Among the methods used for closing the form-segments, for radial clamping of the tire to be vulcanized, radial displacement by sliding along the inner surface of the cone-mantle is well known. Such a solution is described in the German Pat. No. 2 254 334 and in the European Patent Application No. 0 170 109.

When closing the vulcanizing form a downwards tending force affects the structural element lying topmost, this force is to be transferred to the segments performing radial clamping of the raw tire so that orientation and clamping should be the possibly best. For this purpose the socalled pre-stress gap used to be applied, that increasing pressure force should attack towards the sliding segments only up to a certain limit and only after having surpassed said limit value the central larger surface of the upper sheet could bear up, when orientation against high friction does not take place anymore. Accordingly, the pre-stress gap will be formed between the parts which lie within the flanges of two structural elements fitting to each other with the upper planar surfaces, whereas critical pressure force closing the gap will be determined by the elastic deformation resulting from the dimensions and material fo the pressed sheet. In case, if the pre-stress gap is too small, due to early closing it may happen more easily that sprues are forming on the tire due to inproper fitting. In case, if the pre-stress gap is too large, the upper form-half may rise due to the lifting effect of the vulcanizing pressure, as a consequence, the vulcanized tire will be one sided.

The drawback of the known and presently used equipment lies in that the pre-stress gap can be modified with difficulties only, e.g. by cutting. Gaps of different size are to be ordered to tires of different sizes.

SUMMARY OF THE INVENTION

The aim of our invention lies in achieving increased technological elasticity in the course of production of differently dimensioned tires and developing the simple reversible changeability of the aforementioned pre-stress gap. A further aim lies in to use the available form-segments and presses without the necessity of changing.

We arrived at the recognition in so far as mechanism of form closing enables the positioning of form-segments of different sizes into the form-carrier so, that arising closing force should be in compliance with the optimal circumstances of vulcanization. In order to be able to improve quality of closing a reversible setting device may be constructed which regulates the pre-stress gap.

To achieve the aim set, a form carrier and actuating device was developed which can be applied to the vulcanizing machines of tires of motor vehicles, in particular radial ties. The connection with the dome of the vulcanizing machine is established by means of a catch-ring, additional elements of the upper part moving vertically are connected thereto, so an upper plate, a locking ring, the gliding segments which are connected to the inner conical or pyramidal surface of the ring so, as being movable askew on guide rails, the form segments are connected therewith in an exchangeable way. Horizontal motion of the gliding segments is promoted by the gliding plates. Magnitude of the prestress gap between the catch-ring and the upper plate can be adjusted by means of a correction-ring, which is provided with setting and fixing screws.

BRIEF DESCRIPTION OF THE DRAWINGS

The invention will be described in detail by means of a preferred embodiment with reference to the drawings enclosed, wherein.

DETAILED DESCRIPTION OF THE DRAWINGS

Figure 1:
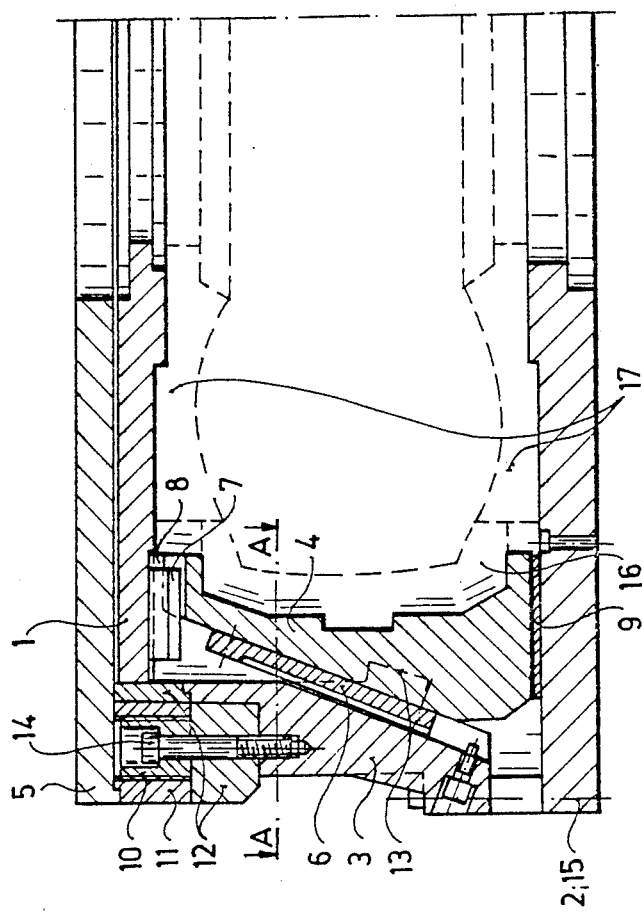
FIG. 1 is the radial semi-sectional view of the form carrier in the closed state.
Figure 2:
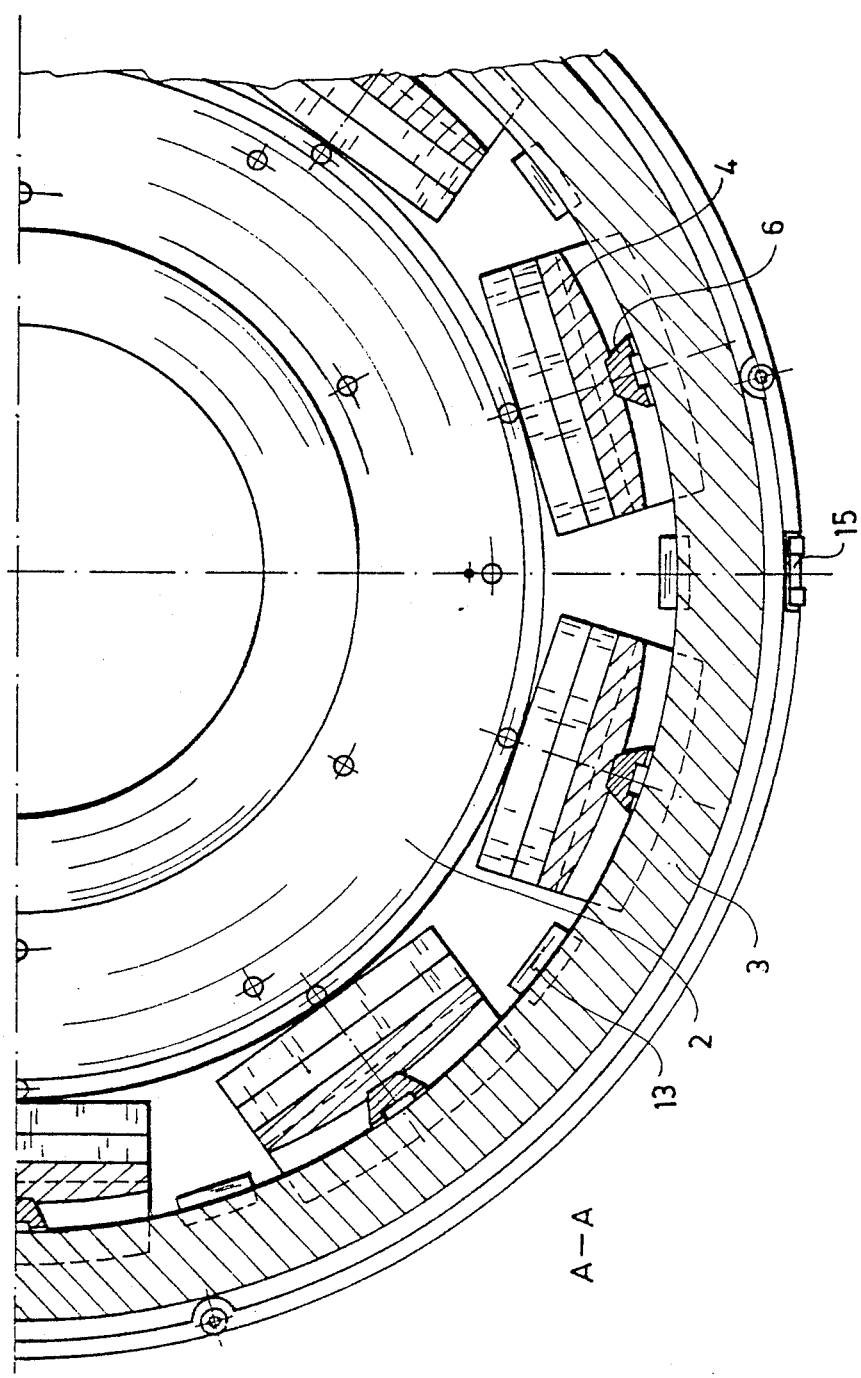
FIG. 2 is the top view of the form carrier according to FIG. 1, FIGS. 3 to 7 are showing the radial sectional views of the form carrier in different states.

FIG. 1 illustrates the radial sectional view of the main elements of the form carrier in the closed state. Radial displacement of gliding segments 4 inserted between gliding plates 8, 9 installed on a base plate 2 and the upper plate 1, respectively, can be established by the aid of a conical or pyramidal surface. By moving the conical surface and exchanging the gliding plates 8, 9 a wide range of sphericity can be spanned. As a matter of fact, a line 7 is mounted onto the upper plate 1 and the gliding segment glides therein. If we change the gliding path of the gliding segment 4, formed by the line 7 and the upper gliding plate 8, the distance to the upper plate 1 can be changed. The process is similar in case of the lower gliding plate 9 and the base plate 2. With the pyramidic gliding surface the correction device enables the considerable variation of the diameters of the mountable forms (form-segments 16 and the form-halves 17) without increasing the size and weight of the carrier structure in an uneconomical way. At the same time displacement of a locking ring 3 and the gliding segments 4 do not result in geometric inaccuracies in contrast to the solution with the conical surface.

Under correction construction a correction ring 11 is meant with adjusting elements arranged therein, so a set-screw 10 and a fixing screw 14, as well as with removable insert rings 12.

Due to their position, the threaded set-screws 10 built-in into the correction construction forward the locking force of the vulcanizing machine directly to the segments, thus possibility of deformation is reduced to the minimum.

Dimensions of the gliding segments 4 built-in into the form carrier were chosen so that the locking force arising in course of vulcanization should load the gliding surfaces in dependence of their material. For this purpose we used gliding elements made of self-lubricating materials not requiring lubricants; in addition to the simplified maintenance the outflowing lubricant cannot be pressed into the raw rubber, thus avoiding wastes becomes possible. The gliding segments do not contact one another in the closed state. The incorporated form-segments 16 and the form-halves 127 connected thereto establish the closed form-chamber.

By modifying the proper structural elements of the form carrier internal heating can be obtained. The degree of freedom of the form carrier does not require guiding the lower stationary and the upper moving part to each other, accordingly approaching guiding of said parts play a role in course of assembling into the vulcanizing machine only.

The main parts of the form carrier are the movable part and the stationary part.

The movable part, which is installed into the dome of the vulcanizing machine comprises the following: The upper moving part of the form is fixed to the fixing bores of the dome by means of the catch-ring 5. The form carrier is connected to the working cylinder via the upper plate 1. The lines 7 with the trough-like shape and "T" cross-section connected to the gliding segments are mounted onto the upper plate 1 with the insertion of the exchangeable upper gliding plates 8. The upper form-half is mounted into the upper plate 1 with screws.

The inner conical surface of the locking ring 3—advantageously with a half-aperture angle of 23°—closes the gliding segments 4. On the inner surface the bronze-coated path of the prismatic guide lath 6 is to be found which is pulling out the gliding segment 4. The path having been etched into the outer surface of the locking ring 3 meets a guide 15 built on the base plate 2.

The gliding segment 4 is connected to the locking ring 3 with a conical surface, it is pulled out with the prismatic guide lath 6 mounted thereon. For reducing friction it is provided that the gliding plates 8, 9, be preferably self-lubricating. The form-segments 16 are fixed in the gliding segments with screws.

Figure 6:
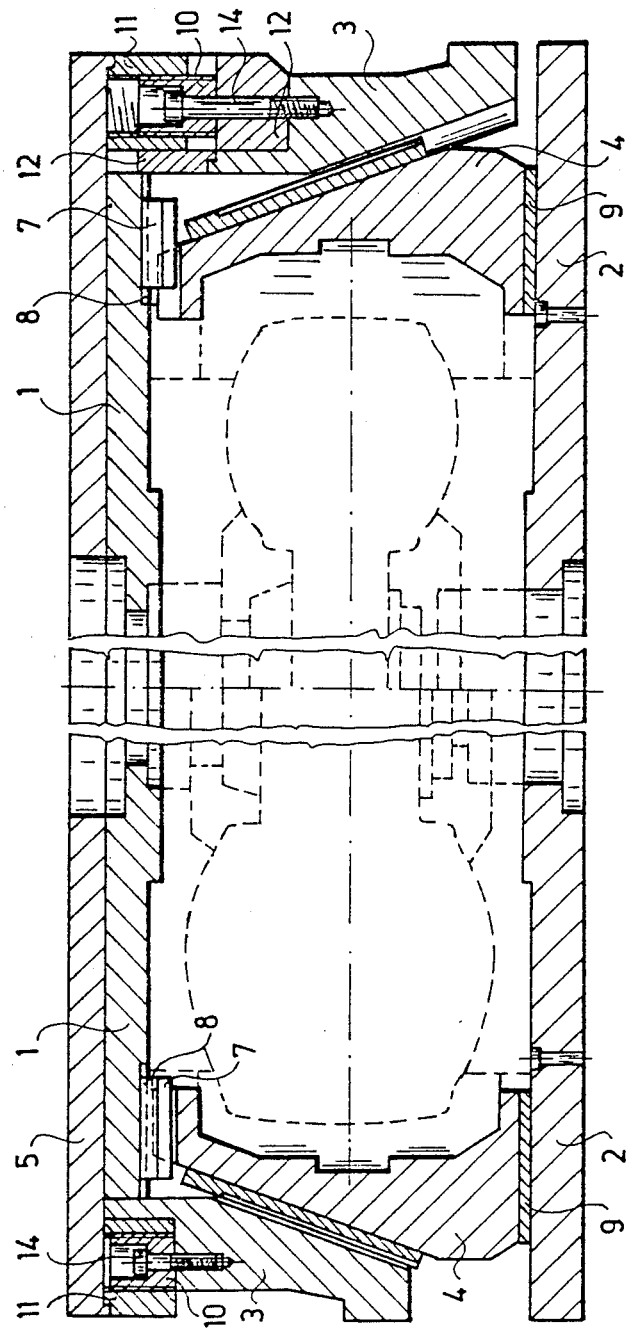

The pre-stress gap can be modified by means of the set-screw incorporated into the correction ring 11, it also serves for reducing the diameter which can be built-in. By removing the insert rings 12 the diameter can be increased (FIG. 6).

Figure 7:
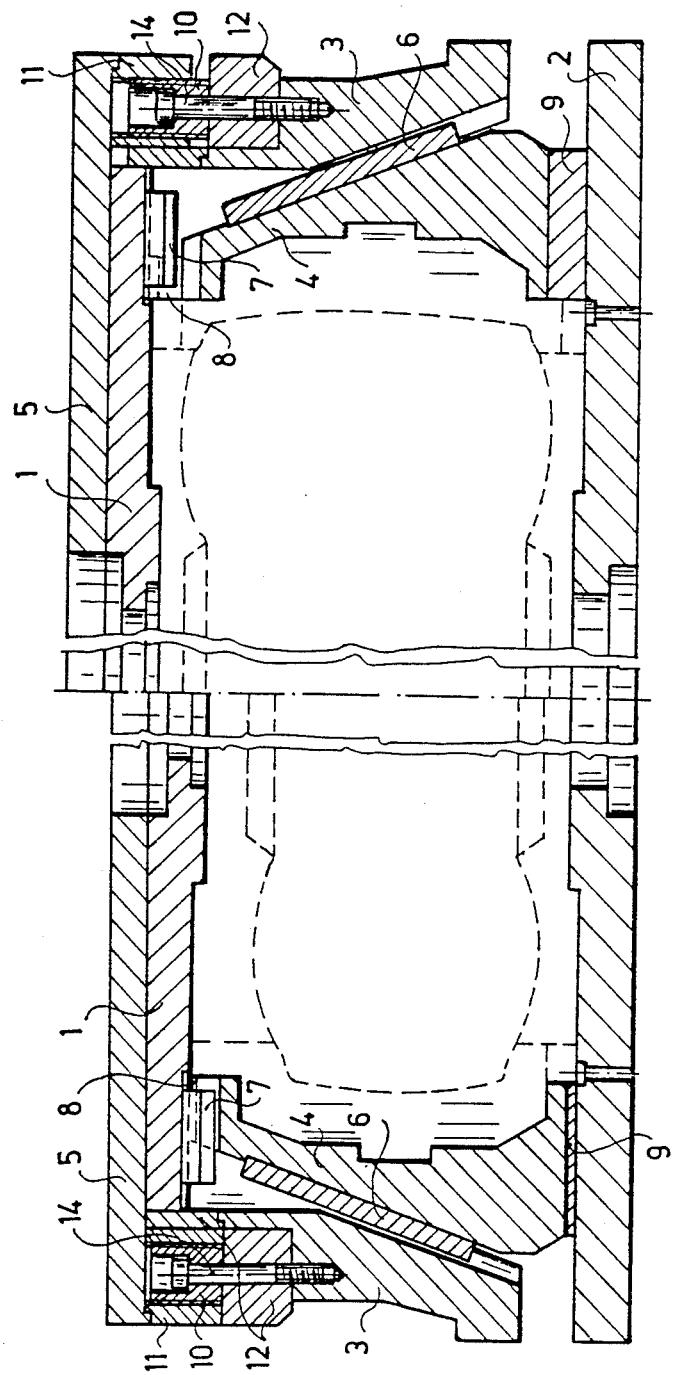

By changing the lower gliding plate 9 and the upper gliding plate 8 dimensions of sphericity of the forms built-in into the form carrier can be modified (FIG. 7). Layout of the bottom part fixed to the table of the vulcanizing machine by means of the bores bored in the base plate 2. The lower form-half 17 is attached thereto.

Orientation of the upper part and the first part is achieved by the guide 15 fixed to the base plate 2.

As exchangeable components the following form-components—belonging specifically to the tire to be produced—are to be built in:
the upper and lower form-half 17,
the form-segments 16,
forms and bellows-rings.

Figure 3:
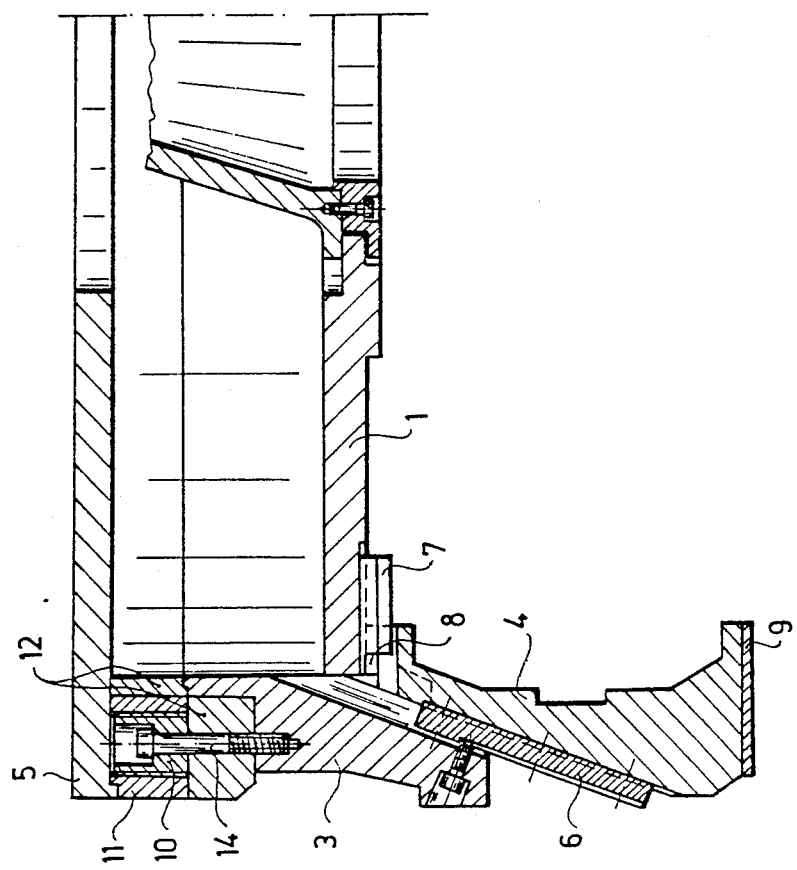

First of all let us survey the operation of the construction according to the invention in course of the closing process. In the first phase of the closing motion the piston pressure acting onto the upper plate 1 presses the gliding segments 4 outwards and keeps them open radially (fig.3). By this open position it can be achieved that the raw tire arranged therein should not collide with the segments (the form-segments 16 fixed in the gliding segments 4 with screws). Extent of opening of the upper form-part is determined by the limiters 13 built into the locking ring 3.

In the second phase of closing procedure the gliding segments 4 reach the base plate 2 (FIG. 4), further on, closing is performed by the locking ring 3 moving downwards. As the locking ring 3 is moving downwards, it compels the gliding segments 4 contacting on the mantle of the cone or the pyramid surface, to a radial displacement. In this phase of closing the piston rod of the working cylinder is pressed back continuously, while the upper plate 1 approaches the fixing plate of the dome. After having finished the closing procedure, the incorporated form-halves 17 and the form-segments 16 fixed onto the gliding segments 4 with screws are fit against each other, thus forming the form-chamber. The upper plate 1 with the form-half 17 fits closely to the upper plate of the dome. Upon the pressure the pre-stress gap will be smaller, at last it vanishes and the two metal planes are contacting each other.

Vulcanizing process is carried out in the traditional way.

The vulcanizing machine keeps the closed form in a pressed state with a force which corresponds to the vulcanizing pressure. Upon the increased inner pressure the bellows-sack presses the raw tire into the tread form. The raw tire kept under pressure is gradually taking the shape of the form chamber and thus the molded tire is formed.

Figure 4:
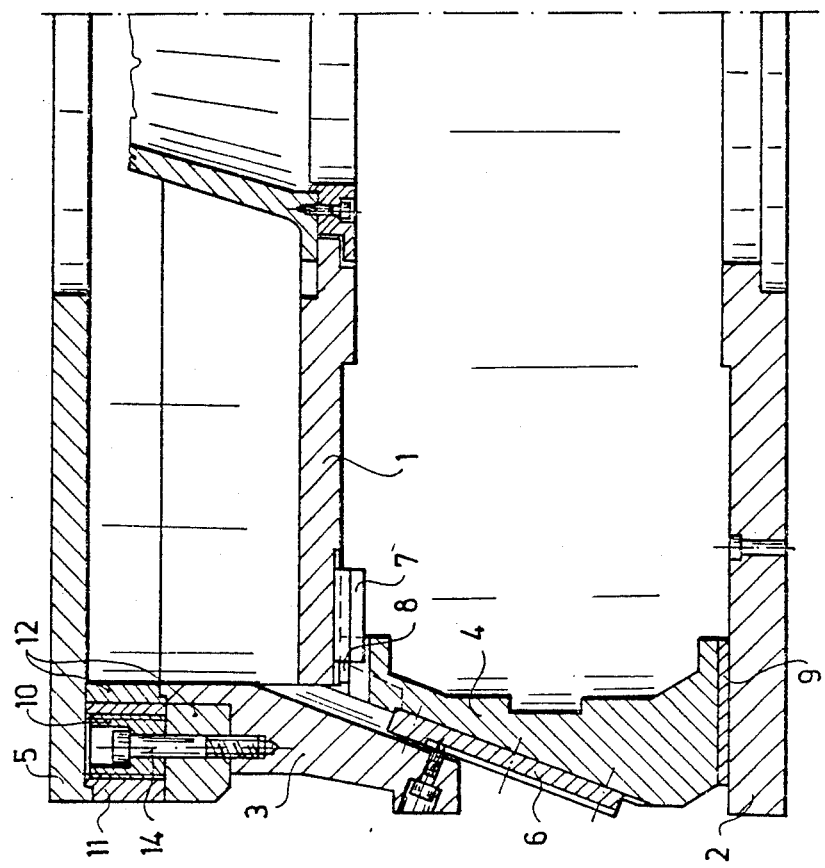

In the first phase of opening, simultaneously with the gradual ceasing of the closing force of the vulcanizing machine, the upper plate 1 is kept in its position by the working cylinder. The ascending locking ring 3 is gradually pulling out the gliding segments 4 having been pressed by the upper plate 1 outwards by the aid of the guide lath 6 built therein. Radial opening is continued as long as the upper plate 1 is reaching the limiters 13 (FIG. 4).

Figure 5:
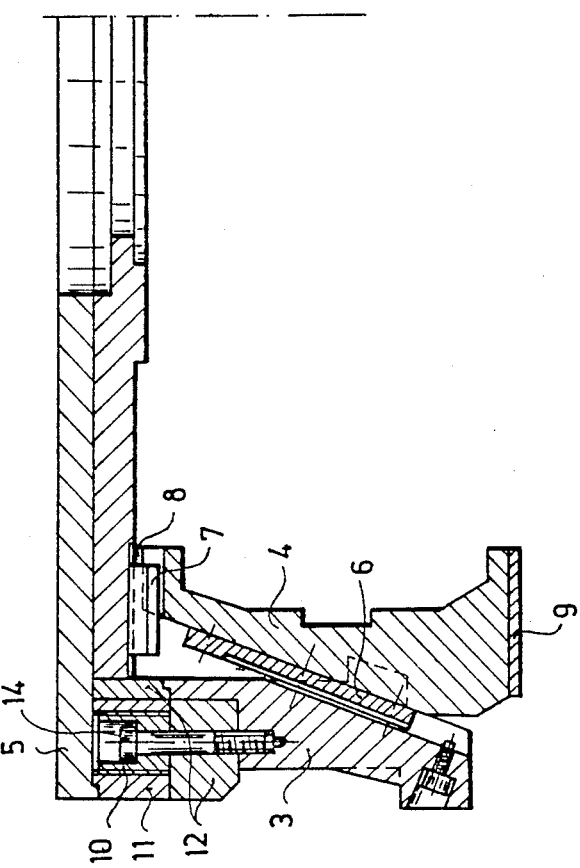

At last the whole upper part is lifted from the base plate 2 (FIG. 3). First the bridge of the vulcanizing machine rise vertically. When opening is completed, the bridge of the machine with the dome installed thereon tilts to enable easy arrangement of the raw tyre. Prior to the tilting motion of the bridge the open gliding segments 4 are to be pulled back by means of the working cylinder and the line 7 with the "T" cross-section mounted onto the upper plate 1 and the upper gliding plates 8 (FIG. 5).

We claim:
1. A form carrier and actuating construction for a vulcanizing machine for rubber tires for motor vehicles comprising: a vertically movable upper part containing a catch-ring connected to the dome of the vulcanizing machine, an upper plate fitting thereto, a locking ring, form-segments defining the upper form-half, while a fixed bottom part includes the base plate and the lower form-half fixed thereto, wherein further form-segments are fixed exchangeably to gliding segments which can be guided askew in guide rails formed on the inner slanted surface of said locking ring and wherein said gliding segments are connected to said upper plate with the insertion of horizontal guide elements and said locking ring and there is a correction ring provided with setscrews and fixing screws for the adjustment of a pre-stress gap between the catch-ring and the upper plate.

2. A construction as claimed in claim 1, wherein regulating elements enabling the change of the diameter within the size range of the tire belonging to one certain vehicle category are used.

3. A construction as claimed in claim 2, wherein said regulating elements are set screws.

4. A construction as claimed in claim 1, wherein elements enabling modification of sphericity are exchangeable gliding plates.

5. A construction as claimed in claim 4, wherein said gliding surfaces are made of self-lubricating materials.

6. A construction as claimed in claim 1, wherein said construction is provided with one or more insert-ring which can be removed from said construction for changing dimensional ranges.

7. A construction as claimed in claim 1, wherein further regulating elements for adjusting the pre-stress gap are applied.

8. A construction as claimed in claim 7, wherein said further regulating elements are set screws.

9. A form carrier and actuating apparatus for use in vulcanization of a range of different sized tires comprising:
  (a) a catch-ring;
  (b) a locking-ring with a slanted interior surface adjustably connected to said catch-ring;
  (c) a plurality of guide laths fitting within slots etched into said catch-ring;
  (d) a plurality of gliding segments attached to said guide laths, said gliding segments having upper gliding plates;
  (e) an upper plate having gliding troughs dimensioned such that said upper gliding plates fit within said gliding troughs;
  (f) an upper form half attached to said upper plate;
  (g) a plurality of form-segments attached to said gliding segments;
  (h) a base; and
  (i) a lower form-half, wherein said catch-ring is lowered toward said base until said gliding segments contact said base, whereupon said gliding segments and the attached form-segments are driven radially inward as said slanting interior surface moves down with respect to said gliding segments until said upper form half, lower form half and said form-segments combine to create a closed form chamber and said catch-ring and said upper plate are positioned such that an adjustable pre-stress gap of proper dimensions is achieved through said adjustable connection between said locking-ring and said catch-ring.

10. An apparatus as claimed in claim 9 wherein said adjustable connection comprises:
  (a) a correction ring concentric with, and abutting, said catch-ring;
  (b) a removable insert ring concentric with, and abutting, said correction ring;
  (c) a plurality of set screws in said correction ring; and
  (d) a plurality of fixing screws passing through said set screws and attaching said adjustable connection to said locking-ring.

* * * * *